United States Patent
Sollee

(10) Patent No.: US 6,169,892 B1
(45) Date of Patent: Jan. 2, 2001

(54) FLOW CONTROL OF AUTHENTICATION TRIPLET REQUEST FOR REDUCING USAGE TIME OF A CENTRAL PROCESSOR

(75) Inventor: Patrick Sollee, Richardson, TX (US)

(73) Assignee: Northern Telecom Limited, Montreal (CA)

( * ) Notice: Under 35 U.S.C. 154(b), the term of this patent shall be extended for 0 days.

(21) Appl. No.: 08/968,806

(22) Filed: Nov. 22, 1997

(51) Int. Cl.[7] .................................................. H04M 1/66
(52) U.S. Cl. ........................ 455/411; 455/435; 455/560
(58) Field of Search ................................. 380/21, 25, 23; 455/453, 38.1, 67.1, 411, 34.1, 435, 445, 410, 560; 370/342; 375/200, 205; 379/111, 112, 229, 230, 243, 58; 395/650; 340/825.33

(56) References Cited

U.S. PATENT DOCUMENTS

| | | | |
|---|---|---|---|
| 5,097,499 | * | 3/1992 | Cosentino ............................... 379/59 |
| 5,101,451 | * | 3/1992 | Ash et al. ............................. 379/221 |
| 5,454,026 | * | 9/1995 | Tanaka ................................... 379/60 |
| 5,537,474 | * | 7/1996 | Brown et al. .......................... 380/23 |
| 5,548,533 | * | 8/1996 | Gao et al. ............................. 364/514 |
| 5,708,710 | * | 1/1998 | Duda ..................................... 380/21 |
| 5,790,955 | * | 8/1998 | Tomoike .............................. 455/453 |
| 5,835,490 | * | 11/1998 | Park et al. ............................ 370/342 |
| 5,862,481 | * | 1/1999 | Kulkarni et al. ..................... 455/432 |
| 5,867,787 | * | 2/1999 | Vudali et al. ........................ 455/445 |
| 6,014,558 | * | 1/2000 | Thomas ................................ 455/410 |
| 6,064,892 | * | 5/2000 | Miyagawa et al. .................. 455/560 |

* cited by examiner

Primary Examiner—Thanh Cong Le
Assistant Examiner—Charles Chow
(74) Attorney, Agent, or Firm—John D. Crane

(57) ABSTRACT

A method of requesting authentication triplets as a function of CPU processing time at a MSC. The MSC requests a new set of authentication triplets from an HLR as a function of how busy the MSC CPU is. During the least busy periods of time, the MSC requests a new set of triplets often and discards some triplets, while during medium busy periods of time the MSC requests a new set of triplets when only, for instance, 2 triplets remain. During the busy periods of time, the MSC only requests a new set of 5 triplets from the HLR when no triplets remain. The present invention, in effect, postpones non-critical work to non busy periods of time when the MSC has more spare processing power, thereby increasing the capacity of the MSC to support traffic during busy periods.

12 Claims, 3 Drawing Sheets

FLOW CONTROL OF AUTHENTICATION TRIPLET REQUEST FOR REDUCING USAGE TIME OF A CENTRAL PROCESSOR

FIELD OF THE INVENTION

The present invention relates generally to wireless communications systems, and more particularly, to a method of performing authentication of a mobile station to ensure that a mobile station is a valid user and reducing the number of authentication triplet requests during busy periods.

BACKGROUND OF THE INVENTION

Authentication is the process by which a mobile switching center (MSC) ensures that the mobile subscriber is really a valid user. In order to authenticate the mobile subscriber, a set of authentication triplets is required from a home location register HLR. Conventionally, the MSC uses one of these sets of authentication triplets each time the mobile subscriber is authenticated, and then throws away this triplet (GSM specification recommendation).

Referring to FIG. 1, there is shown a conventional wireless communication system 10, which may be a GSM, TDMA, CDMA etc. technology. The gateway MSC12 communicates calls between a public switched communication network (PSTN) 14 and a plurality of base switching center (BSCs) 16. The BSCs 16 in turn, service the mobile subscribers (MSs) 18 via RF radio signals. Each MSC 12 has a visitors location register (VLR) 22 for storing currently served MS 18 information. The amount of work the MSC 12 spends on requesting authentication triplets from the home location register of the serviced mobile subscribers (HLR) 20 is significant. Moreover, the amount of work the HLR 20 spends generating these authentication triplets is higher than the work done by the MSC 12. As the overall traffic level e.g. calls and mobility events at a MSC increases, the amount of Authentication increases.

In the past, to increase the capacity of the MSC 12, many different mechanisms have been used. These include hardware upgrades to faster processors, software optimizations, and the reduction of the amount of work required to be done by the MSC 12 e.g. by reducing messaging for inter-VLR location updates such as disclosed in commonly assigned U.S. patent application Ser. No. 08/864,927, entitled "Distributed Subscriber Data Management in Wireless Network" filed May 29, 1997, and U.S. patent application Ser. No. 08/864,926, entitled "Distributed Subscriber Data Management in Wireless Networks from a Central Perspective" filed May 29, 1997, the teachings of which are included herein by reference.

Authentication can occur on the following events: call originations, call terminations, inter-VLR location updates, intra-VLR location updates, and periodic location updates. The frequency of authentication is specified via an operator controlled parameter (except for inter-VLR location updates, which must always be authenticated). Presently, the MSC/VLR can store N authentication triplets per mobile subscriber. "The concept of using authentication triplets is known in the art, and defined by EIA standards." One triplet is used each time an authentication event occurs. The rate that authentication triplets are requested from the HLR is in direct proportion to the number of events that are occurring on the MSC.

In a mobile switch the amount of processor time used is in direct proportion to the number of subscribers, the amount of mobility for each subscriber, and the number of calls processed. As more subscribers move around, and more calls are made, the MSC uses greater and greater percentage of its available CPU processing power. For example, since there are more calls made and more subscribers moving around at 5:00 PM than at 5:00 AM, the available CPU processing power at 5:00 PM is less than at 5:00 AM. Typical traffic peaks and valleys are illustrated in FIG. 3 and FIG. 4. The MSC should be engineered to support the maximum daily traffic period.

Currently, the MSC/VLR can store N authentication triplets per subscriber. One triplet is used each time an authentication event occurs. When an authentication event has been completed, the MSCIVLR checks to see how many triplets are left for that subscriber. If there are X number of triplets left, the MSC requests more triplets from the HLR of that subscriber. A typical setting on a MSC is N=7 and X=2. As can be seen in FIG. 5, the rate that Authentication triplets are requested is in direct proportion to the traffic level at the MSC (The traffic level at the MSC changes based on the time of day).

There is a desire for an improved method to reduce the number of requests to the HLR for Authentication triplets during busy periods in a wireless communications network to achieve a capacity increase on the MSC and a capacity increase on the HLR. This would increase the number of subscribers that may be supported by each MSC during busy periods.

SUMMARY OF THE INVENTION

The present invention achieves technical advantages as a method of dynamically adjusting when authentication triplets are requested from a authentication triplet source as a function of how busy the MSC is, particularly, as a function of the percentage of CPU usage time that is currently being used by the MSC. This is done by dynamically setting the authentication triplet request threshold when a new set of triplets is requested. During less busy times e.g., the MSC may request, for instance, a new set of 5 triplets from the HLR when only 4 triplets remain (X is set to equal 4), thus wasting 2 triplets. During medium busy periods, the MSC may request a new set of 5 triplets when only 2 triplets remain (X=2), thus filling up the subscriber authorization list to 7 triplets. During very busy times, the MSC may request a new set of 5 triplets when 0 triplets remain (X=0) at the MSC for the subscriber period.

The present invention achieves technical advantages by reducing the work done by the MSC to request authentication triplets during busy hours and increasing the work done to request authentication triplets during non busy periods, to increase the overall efficiency of the MSC, especially during busy times. The MSC dynamically determines when a new set of authentication triplets will be requested from the HLR as a function of the percentage of CPU time currently being used. As an example, when less than 20% of the CPU is being used, X=4, when between 20% and 70% of the CPU is used X=2, and when greater than 70% of the CPU is used X=0. N=7 in all cases. There is no penalty for doing extra work in non-busy periods since the MSC and HLR are engineered for busy periods. The MSC dynamically ascertains how busy the MSC CPU is e.g. using the call processing occupancy (CPOCC) data field at the MSC to determine the percentage of CPU time that is currently being used.

DESCRIPTION OF THE PREFERRED EMBODIMENT

Figure 1:
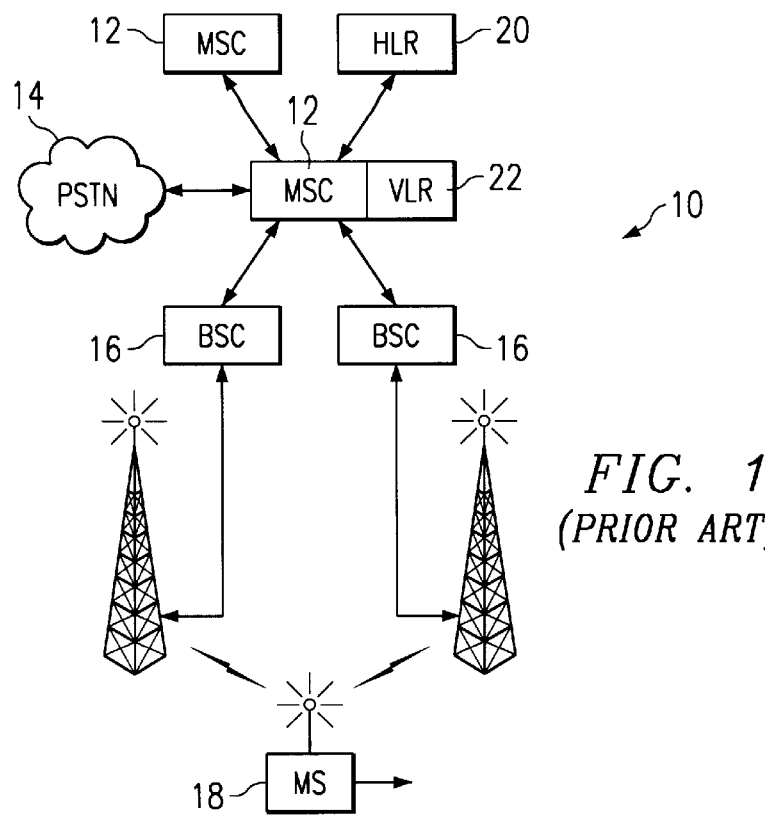
FIG. 1 is a block diagram of a conventional wireless communications network.
Figure 2:
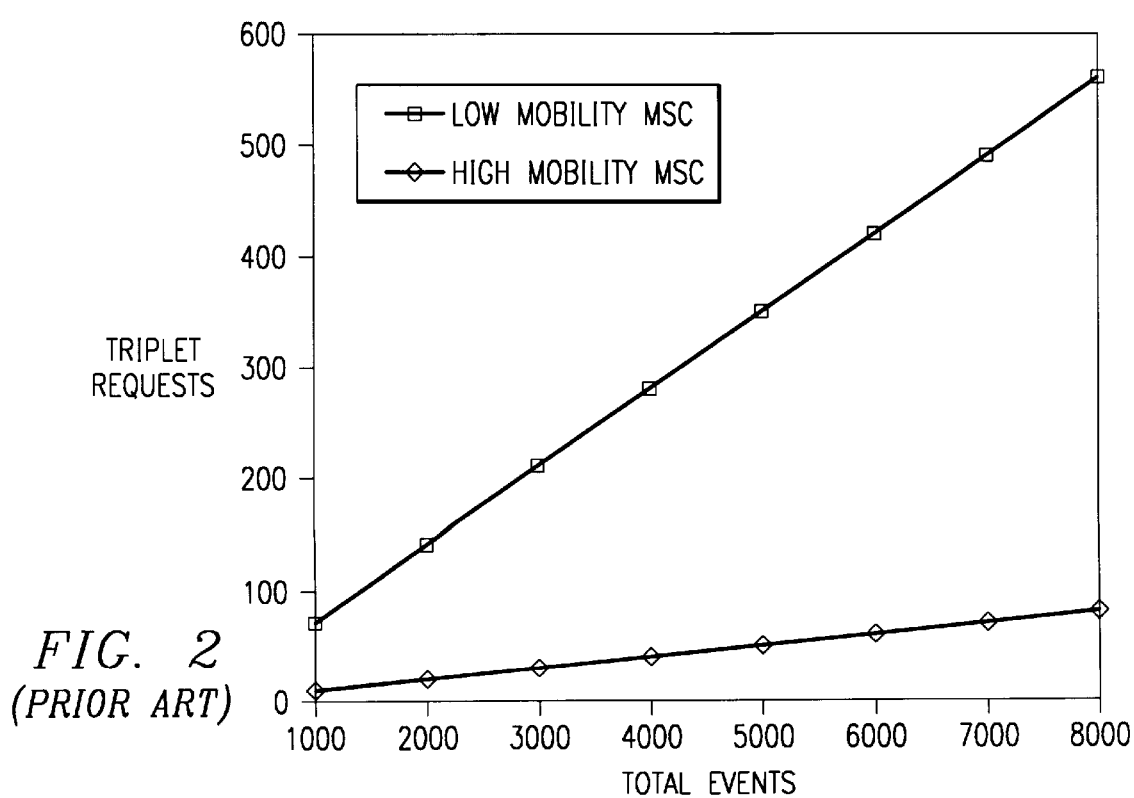
FIG. 2 is a graph illustrating the relationship between events and authentication triplet requests in conventional wireless communication systems.
Figure 3:
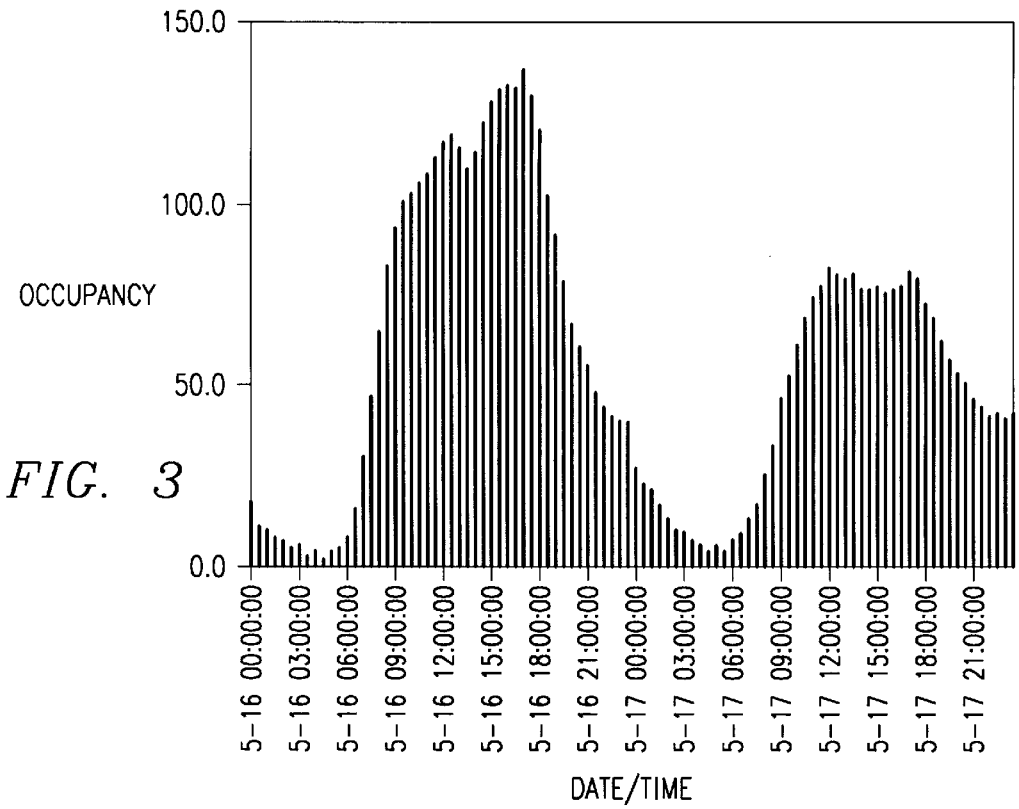
FIG. 3 is a graph of occupancy versus time over a two day period.
Figure 4:
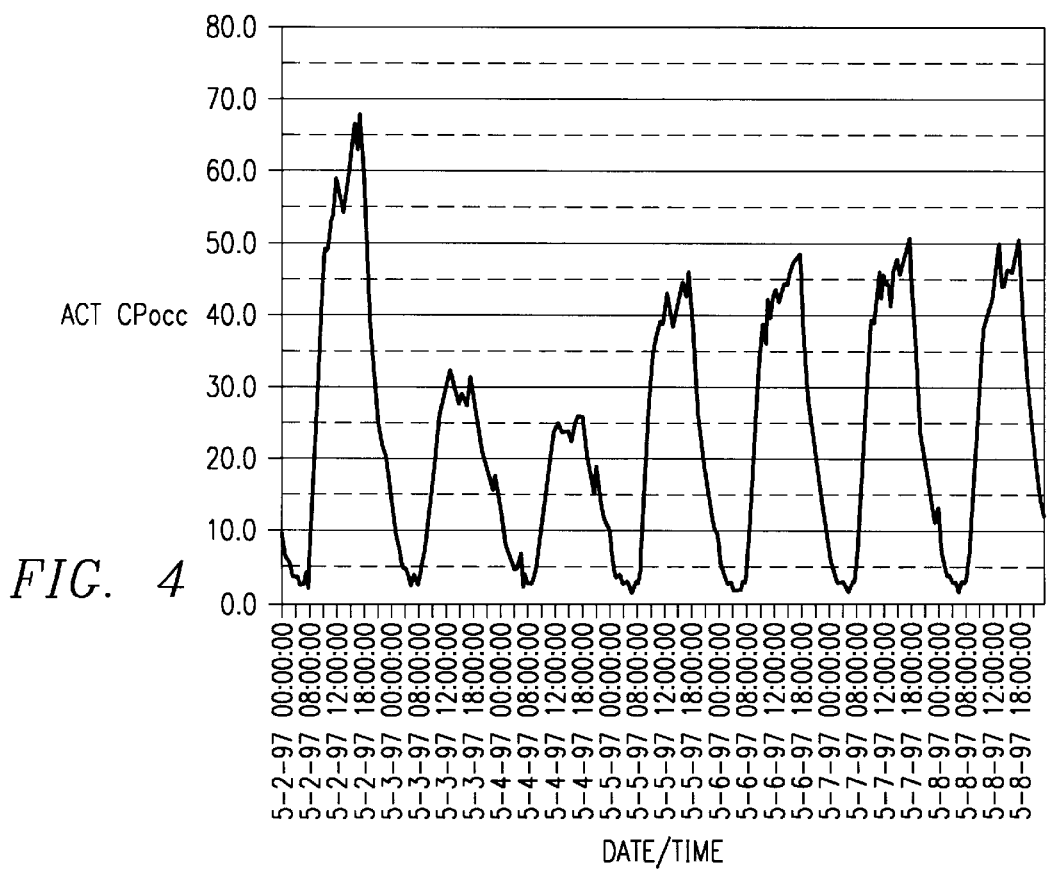
FIG. 4 is a graph of the CPU processing used a function of time over a period of a week.
Figure 5:
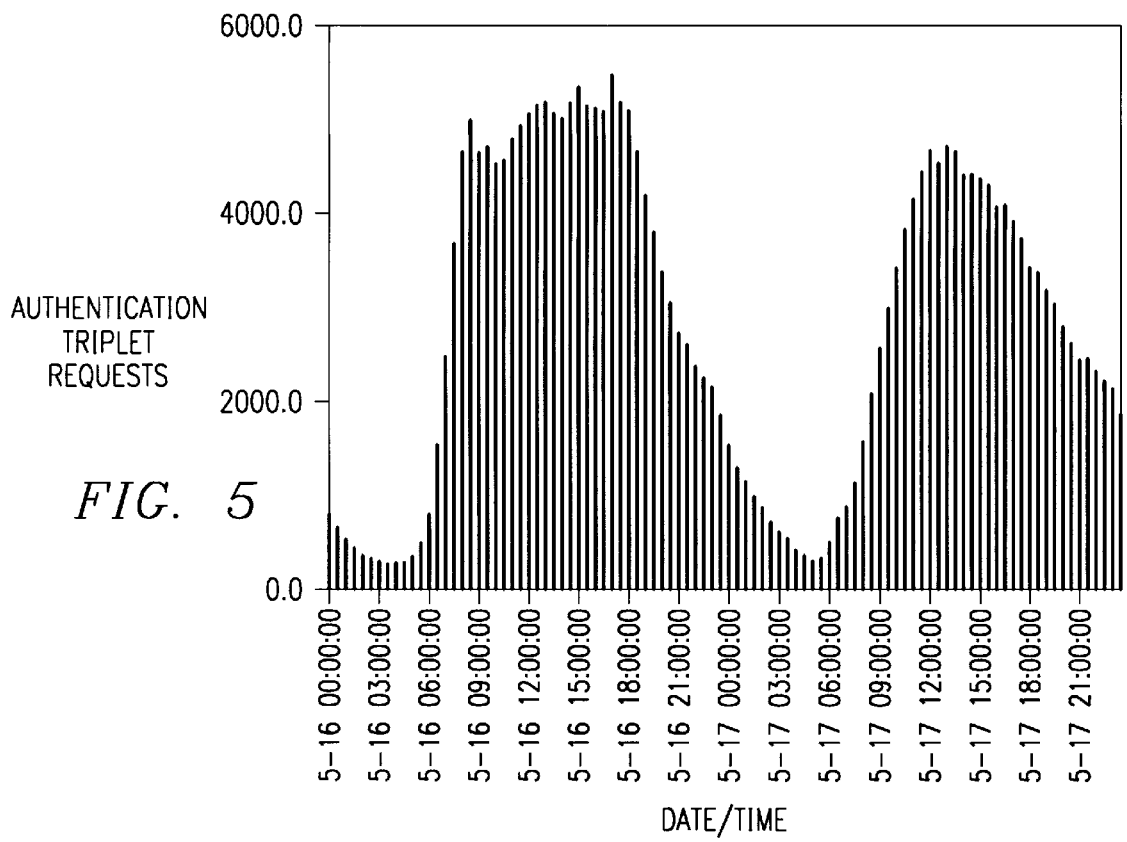
FIG. 5 is a graph of authentication triplet requests as a function of time over a two day period.
Figure 6:
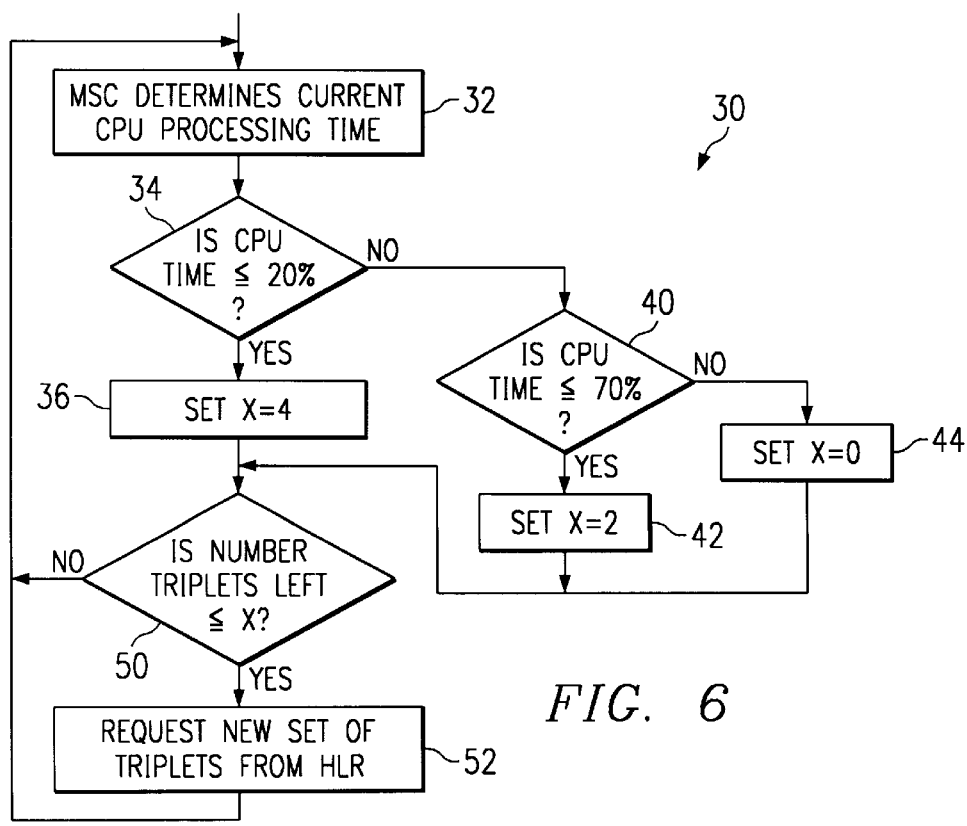
FIG. 6 is a flow diagram of a method for processing authentication triplets according to the present invention by dynamically adjusting when a set of authentication triplets is requested by a MSC from an HLR as a function of the CPU time currently being used.

Referring now to FIG. 6, there is illustrated generally at 30 an algorithm for dynamically setting when a MSC 12 requests a new set of authentication triplets from the HLR 20 as a function of the current CPU usage (processing) time of the MSC. The algorithm 30 of the present invention significantly increases the efficiency of the MSC 12 and HLR 20 during busy periods to increase the number of mobile subscriber the MSC can support during busy periods. The concept of the present invention is postponing non-critical work, namely authentication triplet requests from the HLR 20 to a time when the MSC 12 has more spare CPU processing power i.e. is less busy. During non busy times, the MSC 12 requests authentication triplets from the HLR when a first predetermined number of triplets remain e.g. X=4, and may throw some triplets away if this results in more triplets than may be stored at the VLR 22. During moderately busy times, the MSC requests authentication triplets from the HLR when a second predetermined number of triplets are determined to remain i.e X=2. During very busy times, the MSC only requests triplets from the HLR after it has used all available triplets, e.g. X=0. The overall total work of both the MSC and HLR increases, but the work done during busy hours decreases. This is important since the MSC and HLR are engineered to support a maximum number of mobile subscribers during busy periods. There is no penalty for the MSC doing extra work during non busy periods.

Still referring to FIG. 6, at step 32 the MSC determines the current CPU processing time of the MSC by ascertaining the value of the field identified as CPOCC. CPU processing time is defined as the level of processing (out of 100%) which is currently being used. At step 34, the MSC determines if the ascertained CPU usage time is less than or equal to 20%. If the answer is yes, the algorithm proceeds to step 36 and sets the variable X to equal 4, whereby X represents the triplet request threshold indicating when the MSC will request a new set of 5 triplets from the HLR. If at step 34 the CPU usage time is determined to be greater than 20%, the algorithm proceeds to step 40. If the CPU usage time is determined to be less than 70% i.e. between 20% and 70%, the algorithm proceeds to step 42 and sets X to equal 2. If at step 40 the CPU usage time is determined to be greater than 70% the algorithm proceeds to step 44 and sets X to equal 0. Thus, the triplet request threshold for requesting another set of authentication triplets is set at 0 so that the MSC will not request another set of triplets until no triplets remain at the MSC/VLR.

At step 50, the MSC determines if the number of triplets left is less than or equal to X where X is set by steps 36, 42 or 44 as just described. If the answer is yes, the algorithm proceeds to step 52, and the MSC requests a new set of triplets from the HLR comprising 5 new triplets. If the answer is no at step 50, the algorithm proceeds back up to set 32, and, iteratively proceeds as previously described.

According to the present invention, when X is set to 4 in step 36, the MSC will request a new set of triplets at step 50 when 4 or less triplets remain. In the preferred embodiment, N=7, which is programmable and determines the maximum number of triplets that can be stored by the VLR 22 at MSC 12 for a mobile subscriber, 2 triplets will be discarded. The choice of the value for N is dependent upon the amount of memory available at the MSC. This waste of triplets is not a penalty during non busy periods of time. When X is set to 2 at step 42, i.e., when the CPU usage time is determined to be between 20% and 70%, at step 50 the MSC will request a new set of 5 triplets to bring the number back to 7 triplets available at the MSC/VLR for a particular mobile subscriber. If during the most busy periods of time, i.e. when the CPU usage time is determined to be greater than 70% at step 40, X is set to 0, and thus a new set of 5 triplets will be requested from the HLR by the MSC when no triplets remain at the MSC. Thus, the MSC uses all available triplets for authentication of a mobile subscriber before requesting a new set of 5 triplets from the HLR during the most busy peak periods of time.

In summary, although the overall total work for both the MSC and HLR increases, the work done by the MSC and HLR during busy hours decreases by reducing the number of requests to the HLR by the MSC for authentication triplets during busy periods of time. This results in a capacity increase of the MSC, and also results in an increase capacity at the HLR such that the MSC is available to handle a higher peak traffic of mobile subscribers. Again, the MSC and HLR are engineered for busy periods, and there is no penalty for doing extra work in none busy periods according to the present invention. The present invention is adaptable for use in GSM, TDMA, CDMA and other wireless network systems.

Though the invention has been described with respect to a specific preferred embodiment, many variations and modifications will become apparent to those skilled in the art upon reading the present application. It is therefore the intention that the appended claims be interpreted as broadly as possible in view of the prior art to include all such variations and modifications.

What is claimed is:

1. A method of processing Authentication triplets by a Message Service Center (MSC) in order to avoid requesting the Authentication triplets during its busy periods, the method comprising the steps of:

determining a current CPU usage time of the MSC;

determining if the current CPU usage time is less than a first determining time which is indicative of a non busy period of the MSC;

setting an authentication triplet request threshold to a first threshold setting if the CPU usage time is determined to be less than the first predetermined time;

setting the authentication triplet request threshold to a second threshold setting if the CPU usage time is determined to be greater than or equal to the first predetermined time which is indicative of a busy period of the MSC;

requesting a new set of Authentication triplets from a triplet source when a present number of available authentication triplets of the MSC is equal to or less than the triplet request threshold; and determining if the current CPU usage time is less than a second predetermined time but greater than the first predetermined time, if so, setting the triplet request threshold to a second threshold setting, and if the current CPU usage time is greater than the second predetermined time, setting the triplet request threshold to a third threshold setting, wherein the MSC increases its capacity by dynamically setting the authentication triplet request threshold to the first, second or third threshold settings.

2. A method of processing Authentication triplets by a Message Service Center (MSC) in order to avoid requesting the Authentication triplets during its busy periods, comprising the steps of:

a) determining a current CPU usage time of the MSC;

b) determining if the current CPU usage time is less than a first determining time which is indicative of a non busy period of the MSC;

c) setting an authentication triplet request threshold to a first threshold setting if the CPU usage time is determined to be less than the first predetermined time;

d) setting the authentication triplet request threshold to a second threshold setting if the CPU usage time is determined to be greater than or equal to the first predetermined time which is indicative of a busy period of the MSC; and e) requesting a new set of Authentication triplets from a triplet source when a present number of available authentication triplets of the MSC is equal to or less than the triplet request threshold, wherein the MSC increases its capacity by dynamically setting the authentication triplet request threshold to the first and second threshold settings and wherein the second threshold setting is less than the first threshold setting.

3. The method as specified in claim 1 wherein the third threshold setting is less than the second threshold setting, and the second threshold setting is less than the first threshold setting.

4. A method of processing Authentication triplets by a MSC, comprising the steps of:

a) determining a current CPU usage time of the MSC;

b) determining if the current CPU usage time is less than a first determining time;

c) setting an authentication triplet request threshold to a first threshold setting of four (4) if the CPU usage time is determined to be less than the first predetermined time;

d) setting the authentication triplet request threshold to a second threshold setting if the CPU usage time is determined to be greater than or equal to the first predetermined time; and e) requesting a new set of Authentication triplets from a triplet source when a present number of available authentication triplets of the MSC is equal to or less than the triplet request threshold.

5. A method of processing Authentication triplets by a MSC, comprising the steps of:

a) determining a current CPU usage time of the MSC;

b) determining if the current CPU usage time is less than a first determining time;

c) setting an authentication triplet request threshold to a first threshold setting if the CPU usage time is determined to be less than the first predetermined time;

d) setting the authentication triplet request threshold to a second threshold setting of two (2) if the CPU usage time is determined to be greater than or equal to the first predetermined time; and e) requesting a new set of Authentication triplets from a triplet source when a present number of available authentication triplets of the MSC is equal to or less than the triplet request threshold.

6. A method of processing Authentication triplets by a MSC, comprising the steps of:

a) determining a current CPU usage time of the MSC;

b) determining if the current CPU usage time is less than a first determining time;

c) setting an authentication triplet request threshold to a first threshold setting if the CPU usage time is determined to be less than the first predetermined time;

d) determining if the current CPU usage time is less than a second predetermined time but greater than the first predetermined time, and if so, setting the triplet request threshold to a second threshold setting, else setting the triplet request threshold to a third threshold setting of zero (0); and e) requesting a new set of Authentication triplets from a triplet source when a present number of available authentication triplets of the MSC is equal to or less than the triplet request threshold.

7. The method as specified in claim 1 wherein said first predetermined time is approximately 20%.

8. The method as specified in claim 2 wherein said triplet source is an HLR.

9. A method for avoiding initiating a non-critical process by a Message Service Center (MSC) for requesting authentication triplets from a Home Location Regtister (HLR) during the MSC's busy operation periods, comprising the steps of:

defining a series of threshold settings;

determining the MSC's busy operation periods by identifying a current CPU usage time of the MSC; and dynamically adjusting an authentication triplet request threshold to one of the defined threshold settings to ensure that a total number of authentication triplet requests during busy periods of the MSC is reduced.

10. The method of claim 9 wherein the third threshold setting is less than the second threshold setting, and the second threshold setting is less than the first threshold setting.

11. The method of claim 9 wherein the MSC increases its capacity by requesting comparatively less number of the authentication triplets from the HLR if it is busy, but advantageously loads comparatively more number of the authentication triplets from the HLR if it is not busy.

12. The method of claim 1 wherein the second predetermined time is approximately 70%.

* * * * *